April 12, 1960
E. L. ARNESON
2,932,424
BOTTLE CARRIER
Filed Aug. 19, 1957
7 Sheets-Sheet 2
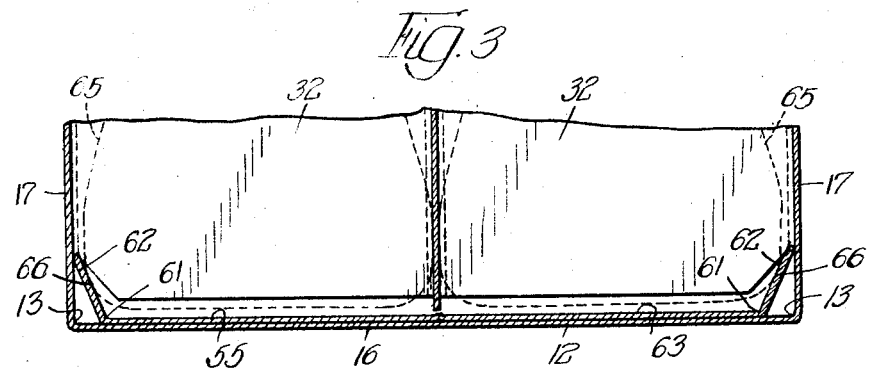
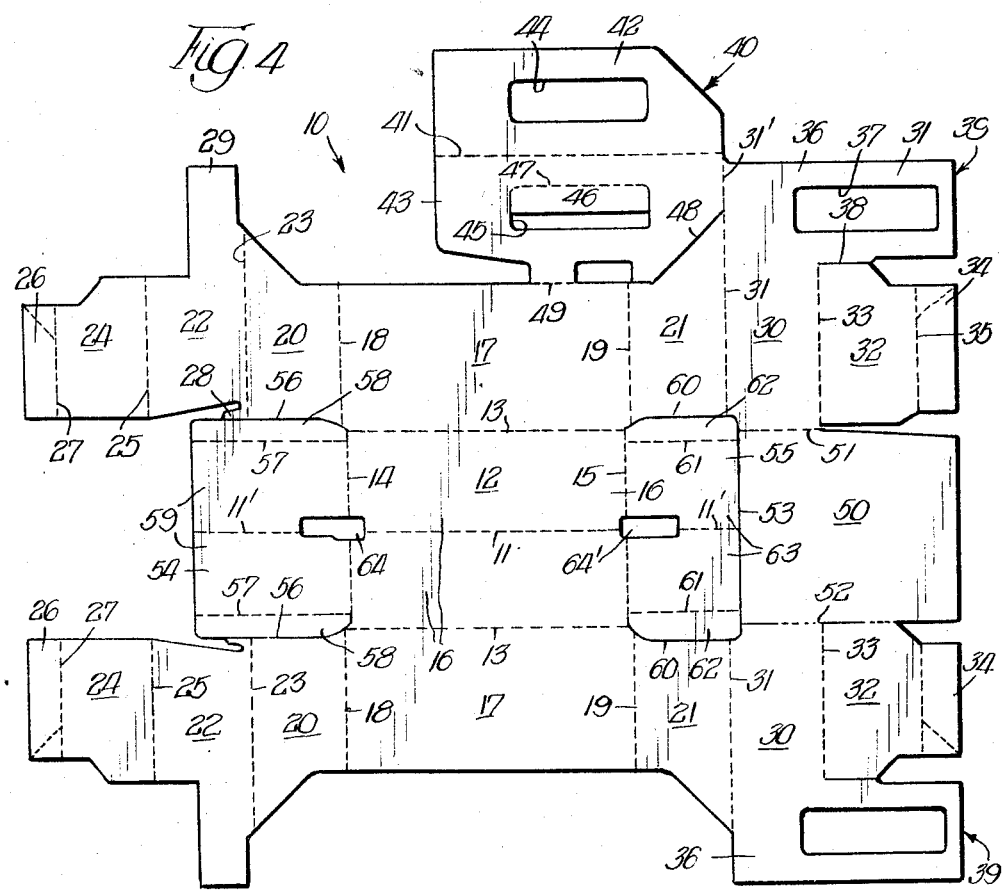
INVENTOR.
Edwin L. Arneson,
BY
Cromwell, Greist & Warden
Attys

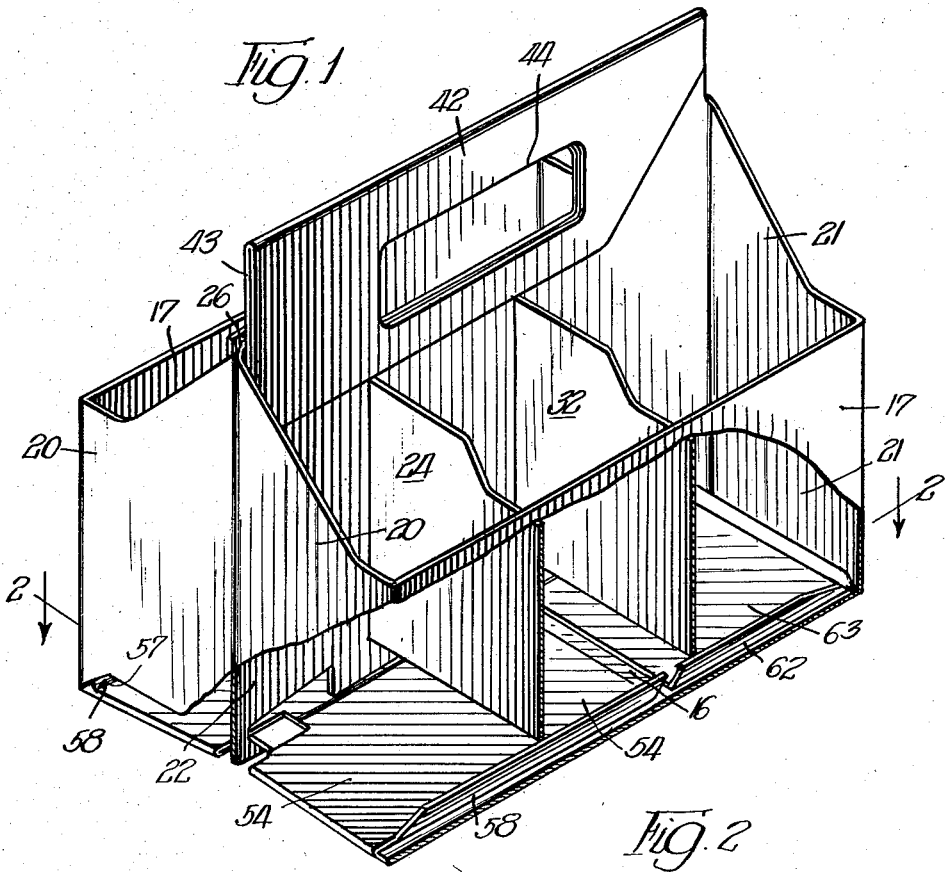

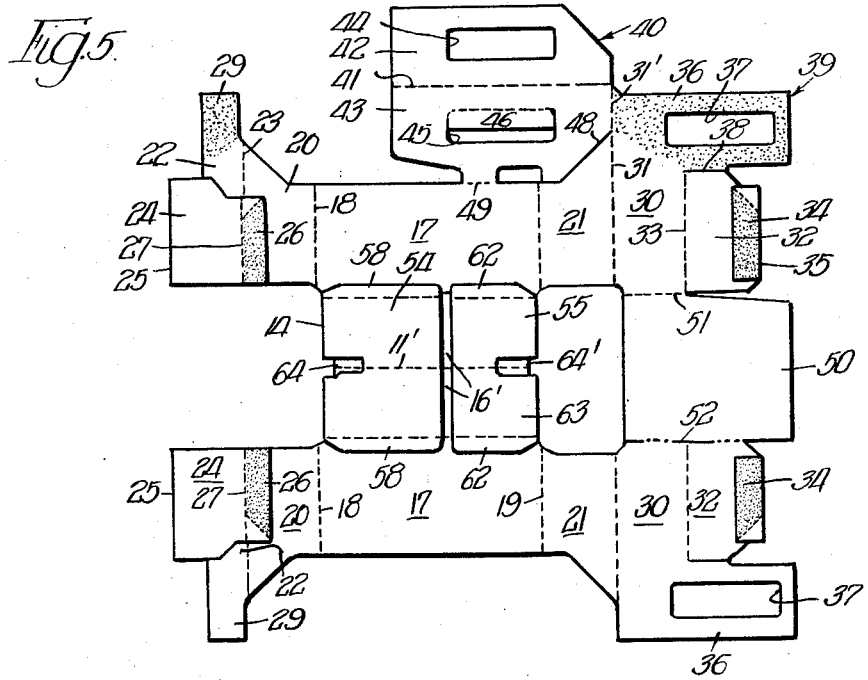
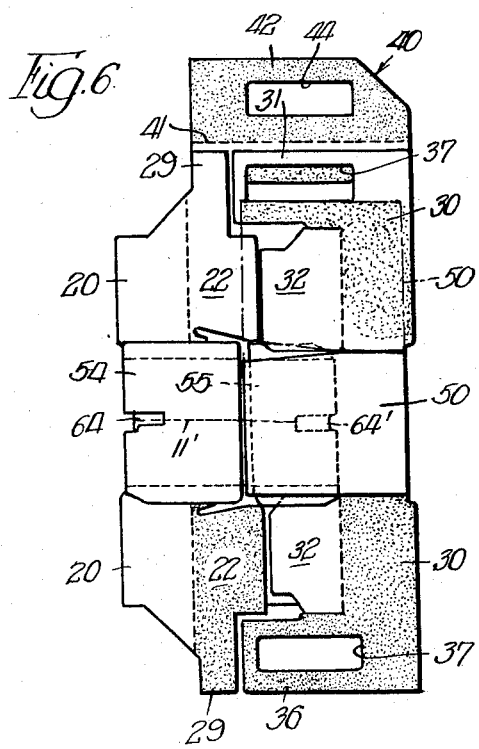
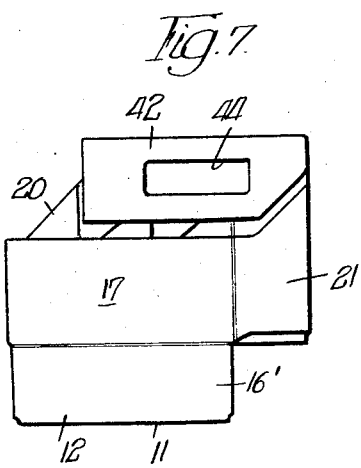

April 12, 1960  E. L. ARNESON  2,932,424
BOTTLE CARRIER
Filed Aug. 19, 1957  7 Sheets-Sheet 4
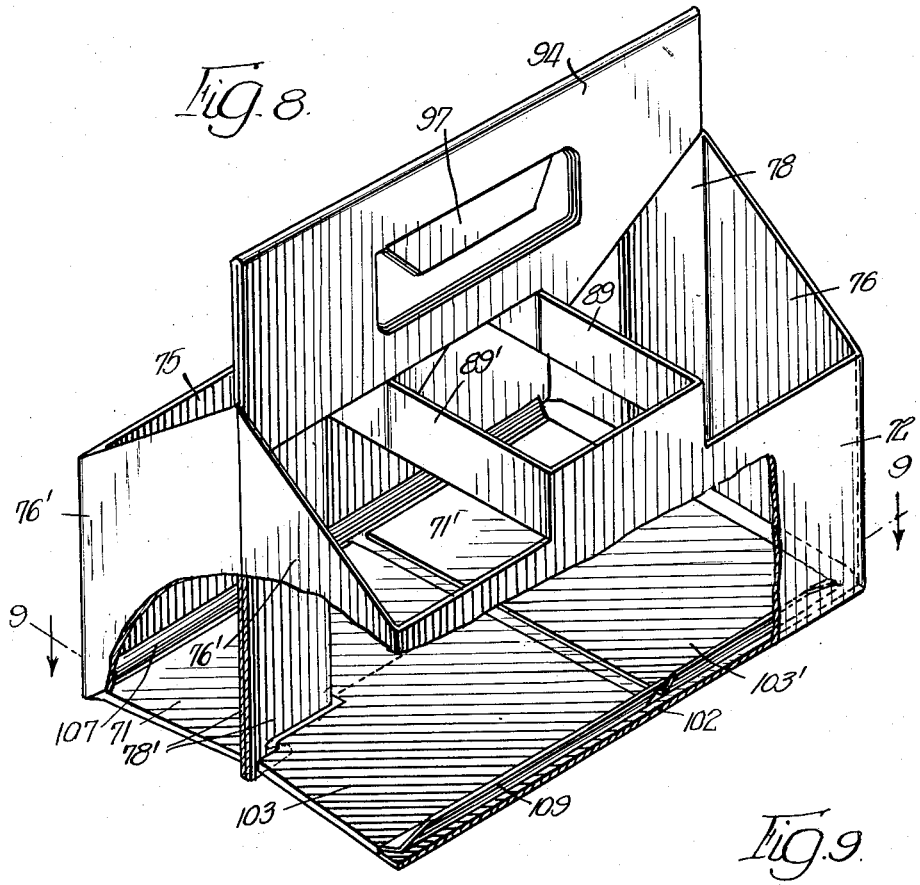
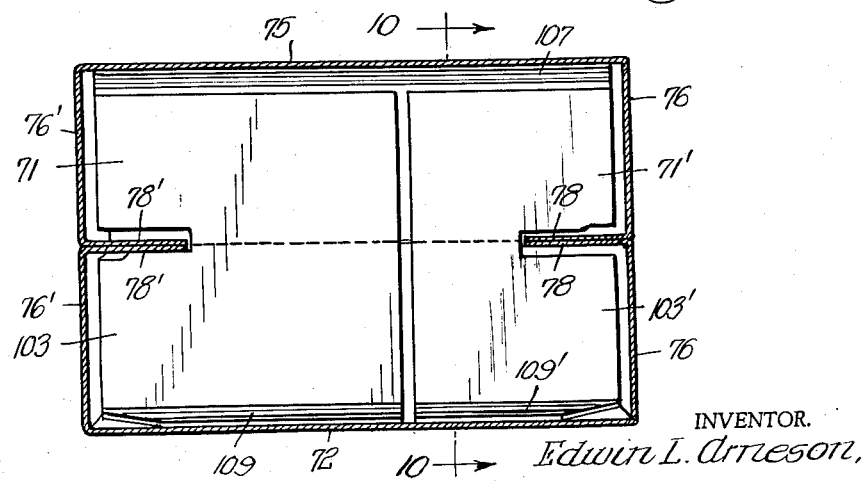
INVENTOR.
Edwin L. Arneson,
BY
Cromwell, Greist & Warden
ATTYS April 12, 1960   E. L. ARNESON   2,932,424
BOTTLE CARRIER
Filed Aug. 19, 1957   7 Sheets-Sheet 5
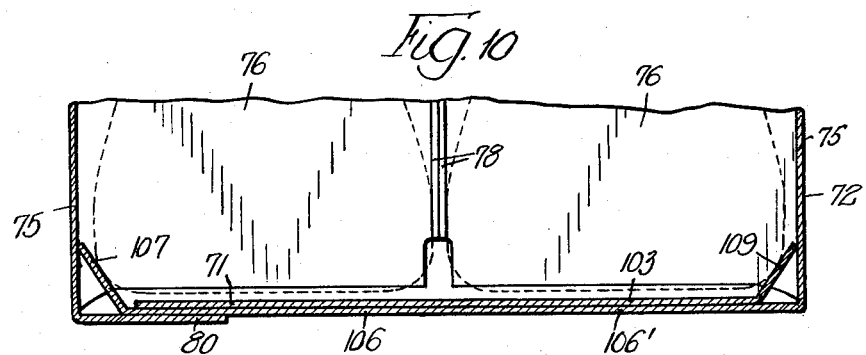
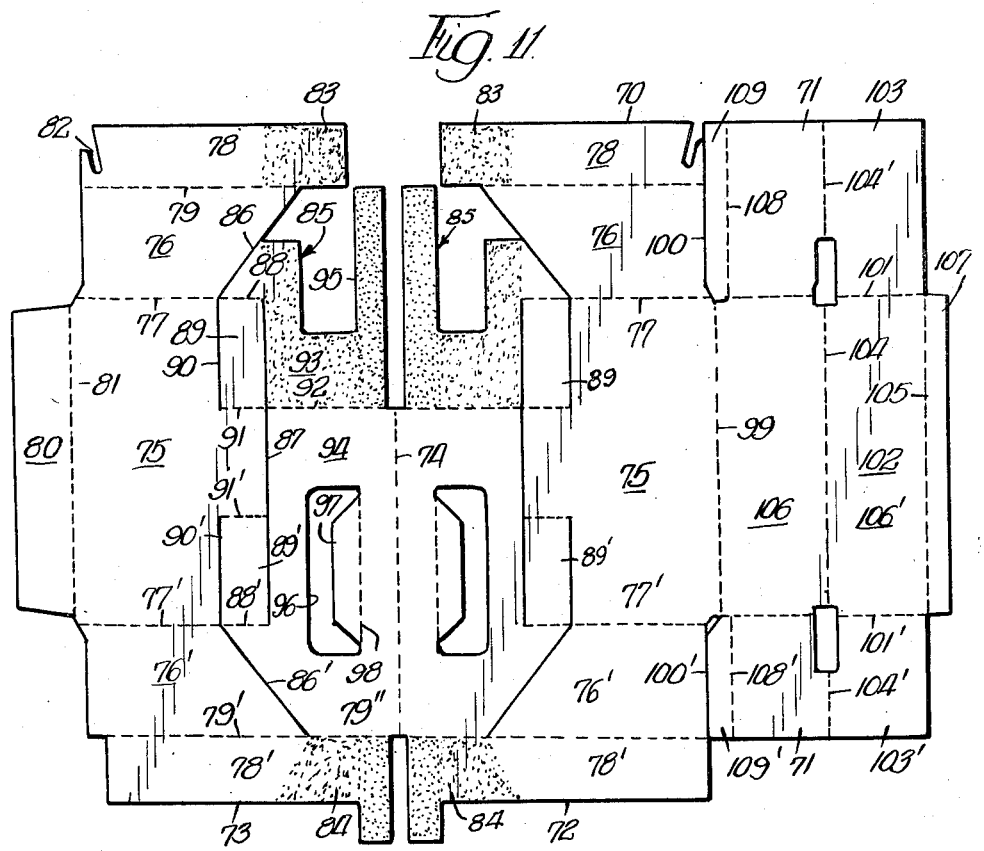
INVENTOR.
Edwin L. Arneson.
BY
Cromwell, Greist & Warden
Attys April 12, 1960 E. L. ARNESON 2,932,424
BOTTLE CARRIER
Filed Aug. 19, 1957 7 Sheets-Sheet 6
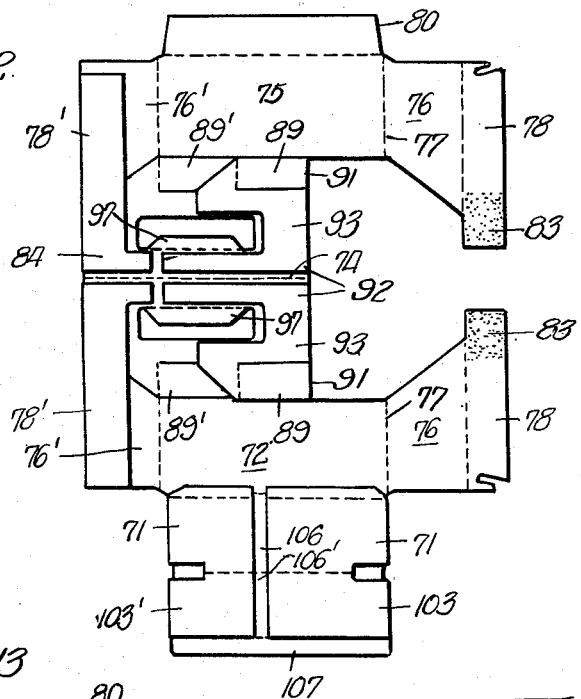
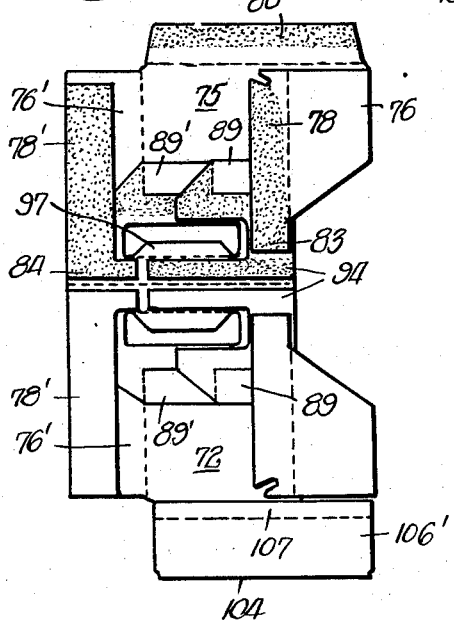
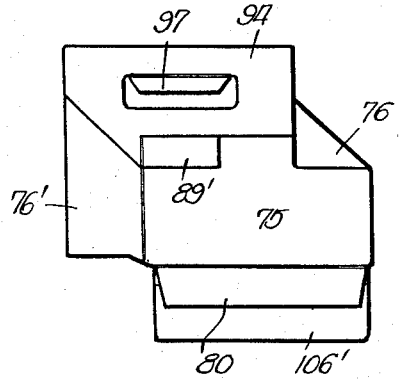
INVENTOR.
Edwin L. Arneson,
BY
Cromwell, Greist & Warden
Attys April 12, 1960     E. L. ARNESON     2,932,424
BOTTLE CARRIER
Filed Aug. 19, 1957     7 Sheets-Sheet 7
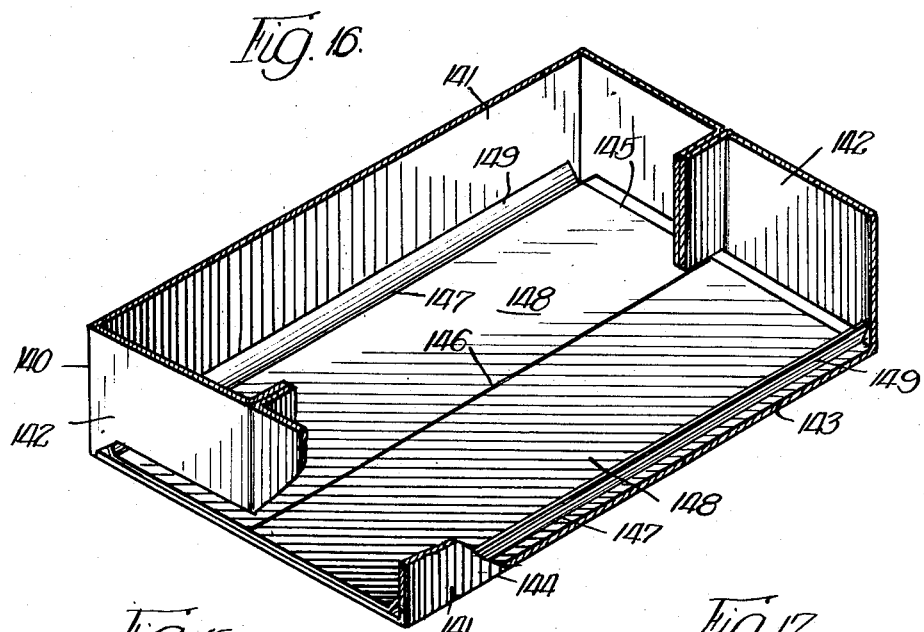
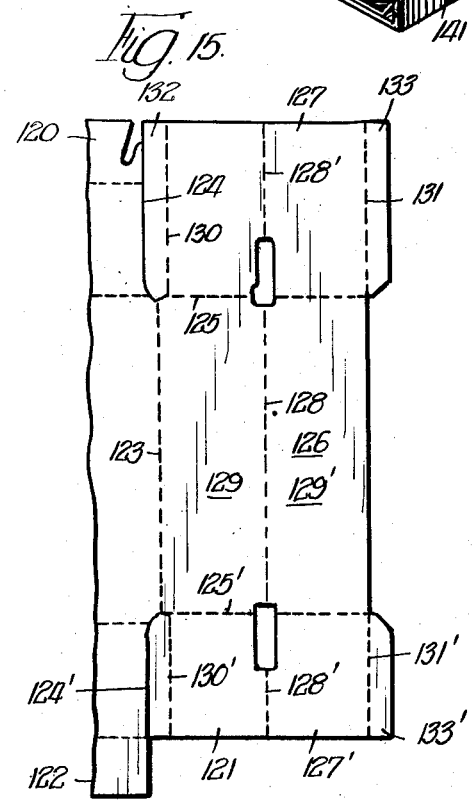
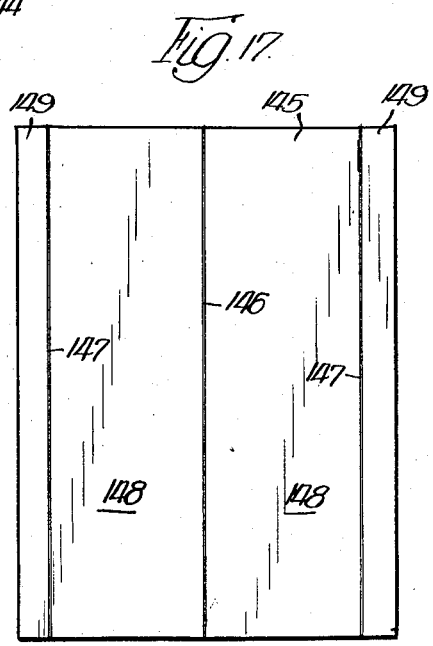
INVENTOR.
Edwin L. Arneson,
BY
Cromwell, Greist + Warden
Attys.

United States Patent Office 2,932,424
Patented Apr. 12, 1960

2,932,424

BOTTLE CARRIER

Edwin L. Arneson, Morris, Ill., assignor to Federal Paper Board Company, Inc., Bogota, N.J., a corporation of New York Application August 19, 1957, Serial No. 678,989

9 Claims. (Cl. 220—113)

This invention relates to article carriers and is more particularly concerned with improvements in paperboard carriers for beverage bottles or similar articles.

It is a general object of the invention to provide a paperboard carrier of the type generally employed for carrying bottled beverages which is characterized by hingedly connected upright side and end walls, a bottom wall extending between the bottom edges of a pair of opposed upright walls, and a combination handle and partition forming structure for suspending the carrier, wherein an improved bottom construction is provided which substantially increases the strength of the bottom structure and greatly lengthens the life of the carton.

It is a more specific object of the invention to provide a paperboard bottle carrier of the type which comprises upstanding peripheral side walls, a connecting bottom extending between two opposed side walls, and a combination handle and partition structure which permits the carrier to be suspended wherein the bottom embodies reinforcing elements which greatly strengthen the carrier at the hinge lines joining the bottom and the side walls, and at the same time provide additional protection for the bottoms of the bottles.

It is another object of the invention to provide a collapsible paperboard bottle carrier which is characterized by hingedly connected upright side and end walls and a bottom wall hingedly connected to opposed upright walls wherein the bottom wall has an inner reinforcing structure which includes side marginal flange members arranged to extend diagonally upwardly from the bottom wall to the upright walls in bridging relation across the hinge areas which connect the same.

It is a further object of the invention to provide a collapsible paperboard bottle carrier wherein opposed side walls are connected at their bottom edges by a bottom wall structure which includes infolded end flaps having side flanges which are hinged thereto on lines spaced inwardly of the hinge lines between the bottom and the side walls and which extend upwardly and outwardly with their outer edges in engagement with the side walls and in spaced relation above the hinge lines whereby bottles placed therein have their bottom outer edges engaged with the upwardly slanted flanges for distribution of the weight of the bottles to the side and bottom walls along lines spaced from the connecting hinge lines.

It is another object of the invention to provide a bottle carrier of the type described wherein the bottom wall structure has an inner reinforcing panel provided along at least one side edge thereof with an upwardly directed flange member which is positioned to bridge across the hinge connection between the bottom and side wall and which is adapted to be engaged by the outer edge portion of bottles placed in the carrier and to distribute the weight to adjoining portions of the hingedly connected side and bottom walls and at the same time provide a cushion-like support for the bottom of the bottle.

These and other objects and advantages will be apparent from a consideration of the several forms of paperboard carrier which are shown by way of illustration in the accompanying drawings wherein:

Figure 1 is a perspective view, with portions broken away, of a bottle carrier having incorporated therein the principal features of the invention;

Figure 2 is a horizontal cross section through the carrier, taken on line 2—2 of Figure 1;

Figure 3 is a partial transverse cross section, on an enlarged scale, taken on the line 3—3 of Figure 2;

Figure 4 is a plan view of the inside face of a paperboard blank cut and scored to form the carrier shown in Figure 1;

Figure 5 is a plan view, on a reduced scale of the blank shown in Figure 4 following certain preliminary folding and adhesive applying operations;

Figure 6 is a plan view of the blank following certain further folding and adhesive applying operations prior to final folding operations;

Figure 7 is a plan view of the completed carrier in the flat knocked-down condition in which it is shipped and stored;

Figure 8 is a perspective view, with portions broken away, of another form of carrier having incorporated therein another form of the invention;

Figure 9 is a horizontal cross section taken on the line 9—9 of Figure 8;

Figure 10 is a partial cross section, on an enlarged scale, taken on the line 10—10 of Figure 8;

Figure 11 is a plan view of the inside face of a paperboard blank cut and scored to form the carrier shown in Figure 8;

Figure 12 is a plan view, on a reduced scale, of the blank shown in Figure 11 following certain preliminary folding and adhesive applying operations;

Figure 13 is a plan view of the blank following further folding and adhesive applying operations prior to final folding operations;

Figure 14 is a plan view of the completed carrier in the flat knocked-down condition in which it is shipped and stored;

Figure 15 is a fragmentary plan view of a modified form of the blank shown in Figure 11 illustrating another form of bottom construction for this type carrier;

Figure 16 is a fragmentary perspective view of the bottom portion of a bottle carrier having incorporated therein a bottom construction which illustrates a further form of the invention; and Figure 17 is a plan view of the inside face of a paperboard blank which is cut and scored to form a reinforcing member for the bottom of the carrier shown in Figure 16.

Referring to the form of the invention shown in Figures 1 to 7, the carrier is fabricated from a generally rectangular flexible paperboard blank 10 (Figure 4). Since the blank 10 is to a considerable extent symmetric about a medial horizontal crease line 11 of a bottom center section 12, corresponding parts in the same relationship on opposite sides of the crease line 11 are indicated by like reference numerals and only one set thereof will be described.

The bottom forming center section 12 is defined by parallel longitudinally extending crease lines 13 equally spaced on opposite sides of the medial crease line 11 and longitudinally spaced transverse crease lines 14 and 15 extending between corresponding ends of crease lines 13. The medial crease line 11 divides the bottom section into two equal bottom panels 16 while the longitudinal crease lines 13 separate the same from adjoining side wall panels 17 and form, in the erected carrier, the bottom edge hinge line between the bottom panels 16 and side wall panels 17. Longitudinally spaced transversely extending crease lines 18 and 19 define the end edges of each side wall panel 17 and form a vertical hinge connection with end wall forming panels 20 and 21, respectively, which extend at opposite ends of the side wall panel 17. A longitudinal partition panel 22 adjoins the one end wall panel 20 and is separated therefrom by a transverse crease line 23 while a cross partition panel 24 adjoins the longitudinal partition panel 22 and is separated therefrom by a transverse crease line 25. The cross partition panel 24 carries a glue flap 26 which is separated therefrom by a transverse crease line 27. The longitudinal partition panel 22 is provided on its inner edge with a notched out locking lug 28 and on its opposite outer edge has a rectangular extension section 29 for a purpose which will be described. The transverse crease lines 18, 23, 25 and 27 are longitudinally spaced a distance equal to the longitudinal spacing between the cells of the erected carrier.

At the other end of the blank a longitudinal partition panel 30 adjoins the end wall panel 21 and is separated therefrom by a transverse crease line 31 while a cross partition panel 32 adjoins the longitudinal partition panel 30 and is separated therefrom by a transverse crease line 33. The cross partition panel 32 carries a glue flap 34 which is separated therefrom and bendable about a transverse crease line 35. The transverse crease lines 19, 31, 33 and 35 are longitudinally spaced a distance equal to the longitudinal spacing between the cells of the erected carrier. The longitudinal partition panel 30 has a handle forming extension panel 36 along its outer edge which projects longitudinally to the end of the blank and which has a died out hand hole 37. This panel is separated from the cross partition panel 32 by the longitudinal cutting line 38 and is foldable with the panel 30 about the transverse crease line 31, the two panels 30, 32 with the handle forming panel 36 and the glue flap 34 forming a corner section 39 of the blank.

An outer handle reinforcing and covering panel member 40 extends along the outer edge of the side wall and end wall panels 17 and 21 at one side of the blank which is adapted to be hinged about the outer end section 31' of the tranverse crease line 31 and which is divided by a longitudinally extending crease line 41 into two similar panels 42 and 43, having hand holes 44 and 45, respectively, with the latter being provided with a locking flap 46 which is foldable about the crease line 47. The handle reinforcing panel 40 is otherwise separated from the remainder of the blank along the cutting line 48 which separates the same from the end wall panel 21 and has a short breakable or perforated connection at 49 with the outer edge of the side wall panel 17 which is broken when the carrier is set up for use.

A longitudinal center partition reinforcing and bottle separating panel 50 is cut out of the center portion of the blank which extends between the two longitudinal and cross partition forming sections 39 at one end of the blank. The panel 50 is cut so that it is freed from the two blank sections 39 and the center portion of the blank except for the longitudinal crease line 51 about which it is adapted to be hinged, and which connects it with the longitudinal partition panel 30 in the one blank section 39, the crease line 51 being aligned with the longitudinally extending bottom side edge forming crease line 13 connecting the bottom and side wall forming panels 16 and 17. The panel 50 is separated from the oppositely disposed blank section 39 by the line 52 which is perforated or weakened so that in setting up the carrier the panel 50 may be broken loose along this line and entirely freed from the one corner section 39 of the blank. The inner end of the panel 50 is cut on the transverse line 53 which frees the panel from the center portion of the blank, the cutting line being offset from the crease line 31 in the direction toward the end of the blank.

Two bottom forming reinforcing flap forming panels 54 and 55 are cut from the center portion of the blank at the ends of the bottom wall forming section 12, being separated from the latter by the transverse crease lines 14 and 15 which define the end edges of the bottom section 12. The longer reinforcing panel 54 extends between the two pairs of end wall and longitudinal partition panels 20 and 22, being separated therefrom on the longitudinal cutting lines 56 which are parallel with and laterally offset from the bottom side edge forming crease lines 13 in the direction of the side edges of the blank. The reinforcing panel 54 is creased on parallel laterally spaced longitudinally extending crease lines 57 which are parallel with but offset inwardly of the longitudinally extending crease lines 13. The crease lines 57 and the cutting lines 56 define side reinforcing flaps or flanges 58 which are free to hinge about the crease lines 57 when the reinforcing panel 54 is folded inwardly onto the inner face of the bottom wall section 12 about the transverse crease line 14. The center or medial crease line 11 is extended at 11' to bisect the reinforcing panel 54 and divide the same into two equal panel sections 59, each of which has a width substanially less than the width of the adjoining bottom wall forming panel 16 to which it is hinged. At the other end of the bottom wall section 12 the smaller reinforcing panel or flap 55 is formed in a similar manner between the two end wall forming panels 21, being separated therefrom by the cutting lines 60, and being separated from the longitudinal reinforcing panel 50 by the transverse cutting line 53. The reinforcing panel 55 is also provided with longitudinally extending crease lines 61 which are parallel with and spaced inwardly of the longitudinal crease lines 13, being aligned with the crease lines 57 in the panel 54 at the opposite side or end of the bottom wall section 12. The medial crease line 11 is also extended through this panel 55 to divide the same into equal panel sections 63, each of which is of less width than the adjoining bottom wall panel 16. Cutouts 64 and 64' are provided at the intersection of the crease lines 14 and 15 with the medial crease line 11 to facilitate the folding or bending of the paperboard at these points.

The blank 10, when cut and creased, is glued and folded to provide the carrier which is illustrated in Figure 1. In settings up the carrier, the cross partition panels 24 are folded inwardly about the crease lines 25 and the glue flaps 34 are folded inwardly about the crease lines 35. An adhesive is applied to the upwardly facing surfaces of the glue flaps 26 and 34 and also to the handle forming section 36 and the handle forming extension 29 of the one panel 22, as indicated in Figure 5. The bottom reinforcing panels 54 and 55 are folded inwardly about the crease lines 14 and 15, respectively, and the longitudinal partition and cross partition sections of the blank at each of the four corners are folded inwardly about the crease lines 18 and 31 as shown in Figure 6. An adhesive is then applied to the upper one of the longitudinal partition panels 30 and portions of the handle panel 36, as indicated in Figure 6, after which the panel 50 is broken loose along the line 52 and folded upwardly about the crease line 51 to bring it into engagement with the folded section 39 of the blank. Thereafter adhesive is applied to the panels 22, 30 and 36 of the lowermost section of the blank, as viewed in Figure 6, and to the handle covering section 40 after which the carrier is completed by folding the lower section about the medial line 11 and folding the outer handle panel 42 about the crease line 41 after the flap 46 has been folded about the crease line 41, providing the carrier, in collapsed condition, as shown in Figure 7.

The inner bottom reinforcing panels or flaps 54 and 55, when folded about the crease lines 14 and 15, are brought into engagement with the inner face of the bottom forming section 12 and the side flanges 58 and 62 fold or break about the crease lines 57 and 61, when the carrier is erected, to bridge over the bottom crease or hinge lines 13 which connect the bottom wall section 12 with the adjoining side walls 17 so that when the bottles 65 (Figure 3) are inserted in the carrier, the bottom outer edge portions 66 thereof engage with the upwardly slanted side flanges 58 and 62 of the reinforcing panels 54 and 55 at points intermediate the longitudinal edges of the side flanges 58 and 62 which cushions the bottoms of the bottles and also distributes the weight of the bottles on the bottom and side wall panels 16 and 17 along lines which are spaced from the edge forming hinge lines 13 connecting the same. The distance between the crease lines 57 and 61 is less than the distance between the hinge lines 13 so that the flange members 58 and 62, in the set up condition of the carrier, are positioned in upwardly and outwardly directed or slanted relation to the bottom wall 12 of the carrier and form a bridge across the bottom side edge hinge lines 13 which are normally the weakest areas in the carrier because of the weight of the contents which rests on the bottom wall 12, the latter being unsupported and unconnected at the end edges and having a connection only with the side walls 17 on the hinge lines 13. By providing this reinforcement of the hinges 13 and relieving the stress directly transmitted to the hinges and distributing the same over the wall areas adjoining the same, the carrier is strengthened at its weakest points and the life of the carrier is greatly increased. Also the construction affords greater protection for the bottles by the cushioning effect of the reinforcing panels and there is less likelihood of damage to the bottles due to rupture of the bottom wall along the medial fold line 11, which sometimes occurs particularly when the bottom wall becomes wet and its strength is greatly reduced, since the reinforcing flaps tend to prevent complete collapse of the bottom wall.

Referring to Figures 8 to 14 of the drawings, there is illustrated another form of carrier having a bottom reinforcing structure embodying the present invention. In this form of the carrier, a generally rectangular blank is cut and creased as shown in Figure 11 to divide the same into a bottom wall forming section 71 and two substantially identical side wall partition and handle forming sections 72 and 73 with the latter two sections being symmetrical about the transverse crease line 74. Since the blank sections 72 and 73 are divided into the various wall forming elements by identical creasing and cutting lines, only one of these sections will be described, the same numerals being applied to the corresponding elements of the other section.

The end section 73 of the blank is divided by longitudinally extending laterally spaced crease lines and transversely extending cutting lines into side wall panel 75, end wall panels 76 and 76' at opposite sides thereof which are separated therefrom by the parallel score lines 77 and 77' extending longitudinally of the blank, and longitudinal partition panels 78 and 78' which are separated from the adjoining end wall panels 76 and 76' by crease lines 79 and 79' also extending longitudinally of the blank. The side wall panel 75 is provided at its free edge with a glue flap 80 of substantial width which is separated therefrom by the transversely extending crease line 81, the latter defining one of the bottom side edge hinge lines of the carrier when it is in set up condition. The one longitudinal partition panel 78 has a notched hook formation 82 at the one end which forms its bottom edge while at the other end thereof it has an extended portion 83 which is adapted to be trapped between panel elements of the handle structure when the carrier is set up. The other longitudinal partition panel 78' at the opposite side of the blank has an L-shaped extending portion 84 at its inner end which is likewise trapped between the panel elements of the handle forming structure when the carrier is set up.

A handle forming section 85 extends between the crease lines 79 and 79' and inwardly of the side wall forming panel 75 terminating at the medial transverse crease line 74. This handle section 85 is hingedly connected to the one longitudinal partition panel 78' by an extended portion 79" of the crease line 79'. The handle forming section 85 is freed from the end wall forming panels 76 and 76' by diagonal cutting lines 86 and 86' and from the side wall forming panel 75 by a transverse cutting line 87 which extends between inner hinge forming sections 88 and 88' of the crease lines 77 and 77'. The crease line sections 88 and 88' form the inner hinges for cross partition straps 89 and 89' which are cut from the corners of the side wall panel 75 on the transverse cutting lines 90 and 90', the latter terminating short of the longitudinal center of the panel and extending parallel to the transverse cutting line 87. Longitudinal crease lines 91 and 91' extend between the spaced inner ends of the cutting lines 90 and 90' and the cutting line 87 to form the outer hinges of the cross partition straps 89 and 89', which straps extend, in the set up position of the carrier, between the handle and longitudinal partition structure and the side wall 75.

The handle and longitudinal partition forming section 85 of the blank is divided by a longitudinally extending crease line 92, which is aligned with the crease line 91, into outer and inner handle forming panels 93 and 94 having hand holes 95 and 96, cut out as indicated, with the latter having a locking flap 97 hinged about the crease line 98.

The bottom forming section 71 of the blank is separated from the remainder of the blank by a transverse crease line 99 which extends between the crease lines 77 and 77' of the middle section 72 of the blank and by transverse cutting lines 100 and 100' which are offset inwardly of the crease line 99 in the longitudinal direction of the blank and which free the bottom forming section 71 from the adjoining panels 76, 78 and 76', 78' at opposite sides of the blank. The bottom forming section 71 is divided by laterally spaced longitudinally extending crease lines 101 and 101' into a central bottom wall forming section 102 and two end extension flaps or panels 103 and 103' which are of unequal dimension in the direction transversely of the blank but are otherwise of identical construction. The center section 102 which forms the bottom wall is divided by transverse crease lines 104 and 105 into two bottom wall forming panels 106 and 106' of unequal width and a relatively narrow flange forming panel section 107, the latter extending along the free end edge of the end bottom wall panel 106'. The width of the inner bottom wall panel 106 is the same as the width of the end wall panels 76, 76' or half the width of the set up carrier, while the width of the outer bottom wall panel 106' is somewhat less than half the width of the carrier, the crease line 104 coinciding with the longitudinal center line of the bottom wall of the carrier. The end extension flaps or panels 103 and 103' are creased on the transverse lines 108 and 108' which are parallel with the transverse cutting lines 100 and 100' and spaced therefrom a sufficient distance in the direction of the end of the blank to provide relatively narrow flange forming panel sections 109 and 109' of approximately the same width as the flange forming section 107. The crease lines 108 and 108' are offset outwardly of the transverse crease line 99 so that when the panels 103 and 103' are folded inwardly about the crease lines 101 and 101' into engagement with the face of the bottom wall forming section 102, the flange forming panel sections 109 and 109' extend over the bottom side edge forming transverse crease line 99 with the side edges defined by the cutting lines 100, 100' with the crease lines 108, 108' being spaced on opposite sides of the crease line 99. The crease line 104 is extended at 104' through the end extension panels 103 and 103' and divides the portions of these panels between the transverse crease lines 108, 108' and the free end edges thereof approximately in half with the width of each half being less than one half the width of the set up carrier.

The blank 70, when cut and creased, is glued and folded to provide the carrier which is illustrated in Figure 8. In setting up the carrier from the blank, adhesive is applied to the handle reinforcing panels 93 and also to the panel sections 83 and 84 of the longitudinal partition panels 78 and 78'. The panels 93 are folded inwardly about the crease lines 91, 92 (Figure 11). The panels 78' and their handle forming sections 84 at one side of the blank are folded about the crease lines 79', 79" and the panels 76 and 78 at the other side of the blank are folded inwardly about the crease lines 77. The flaps 103, 103' on the bottom forming section 102 are also folded inwardly about the crease lines 101 and 101'. Adhesive is then applied to the exposed faces of the handle reinforcing panel 93 and the longitudinal partition panels 78 and 78' including the reinforcing sections 83 and 84 of the one section 73. An adhesive is also applied to the outer marginal portion of the inner face of the flap 80 as shown in Figure 13. Thereafter, the bottom section 102 is folded on itself about the crease line 104 and the section 73 is folded downwardly about the crease line 74 to bring the glued surface of the flap 80 into engagement with the outer surface of the bottom wall panel 106' which completes the gluing and folding of the blank and provides the collapsed carrier shown in Figure 14 which, when opened up, has the form shown in Figure 8.

In the form of the carrier shown in Figure 8, the reinforcing side edge flanges 109 and 109' on the inner bottom wall reinforcing panels 103 extend along and bridge across the bottom hinge 99 while the side edge flange 107 on the outer bottom wall panel 106' bends about the crease line 105 and bridges across the bottom hinge 81 so that the reinforcing flanges 107 and 109, 109' are positioned to be engaged by the opposite outer extremities of the bottoms of the bottles 110 and to relieve the stress on the hinges 81 and 99 in the same manner as in the form of the carrier previously described.

A modified form of bottom construction applicable to carriers of the type disclosed in Figures 8 to 14 is illustrated in Figure 15. In this form of the invention, the carrier forming blank 120 is cut and creased to provide a bottom forming section 121 which is separated from the adjoining middle section 122 of the blank by a transverse crease line 123 which separates the section 121 from the adjoining side wall panel in the blank section 122 and the transverse cutting lines 124 and 124' which are parallel with and offset inwardly of the crease line 123 and which free the bottom forming section from the adjoining end wall and longitudinal partition panels at opposite sides of section 122. The bottom forming section 121 is divided by laterally spaced longitudinally extending crease lines 125 and 125' into a central bottom wall forming section 126 and two end extension panels or flaps 127 and 127' which are unequal in length but otherwise identical. The center section 126 is divided by a transverse crease line 128 into two bottom wall forming panels 129 and 129' of unequal width, the width of the inner panel 129 being equal to one-half the width of the set up carrier and the width of the outer panel 129' being less than one-half the width of the erected carrier. The end extension flaps or panels 127 and 127' are creased on the parallel transverse crease lines 130, 131 and 130', 131' which are spaced from the cutting lines 124, 124' and the end edges of the panels to provide along opposite side edges reinforcing flanges 132, 133 and 132', 133'. The crease line 128 is extended at 128' across the extension panels 127, 127' and divides these panels in half with each half having a width less than one-half the width of the bottom of the set up carrier.

The blank 120 is otherwise cut and scored as in Figure 11 and is glued and folded to form the carrier in the same manner. The bottom extension flaps 127 and 127', when folded about the hinge forming crease lines 125 and 125', overlie the bottom wall forming section 126 with the reinforcing side edge flanges 132, 133 and 132', 133' extending diagonally upwardly with their free edges engaging the upright side walls in the same manner as the side edge flanges 58 and 62 in the form of the carrier illustrated in Figures 1 to 8, relieving the stress in the bottom side edge hinge line and providing a cushion like support for the bottoms of the bottles in the carrier.

A further embodiment of the invention is illustrated in Figures 16 and 17 which is applicable to a carrier 140 (Figure 16) of the type having upstanding side walls 141 and connecting end wall structures 142 with a bottom wall 143 extending between the bottom edges of the side walls 141 and connected thereto along hinge lines 144. The carrier may have one of several different forms of handle and partition structures arranged to accommodate a plurality of bottles or like articles positioned in row forming relation therein and it may be collapsible when not in use with a fold or hinge line extending along the longitudinal center line of the bottom wall 143, the latter being free of the other elements of the carrier except for its hinged connection with the side walls 141 so that it may fold upon itself when the carrier is collapsed. A bottom reinforcing panel 145 is formed from a generally rectangular paperboard blank which is scored on the longitudinal center line 146 and laterally spaced score lines 147, the latter being parallel to the center line 146 and being spaced inwardly of the side edges of the blank so as to divide the blank into two identical panels 148 extending on opposite sides of the center fold or hinge line 146 and each having a relatively narrow flap or flange 149 extending along its outer side edge. The width of each of the panels 148 is less than half the width of the carrier bottom wall 143 so that when the reinforcing blank 145 is positioned in the bottom of the carrier with the panels 148 in engagement with the inside face of the bottom wall 143, the side edge flanges 149 will hinge on the score lines 147 into an upwardly and outwardly inclined position, in bridging relation to the hinge lines 144 where they will be engaged by the outside bottom edges of bottles placed in the carrier so as to distribute the weight over areas of the side walls 141 and bottom wall 143 adjoining the hinge lines 141 whereby to relieve the stress in the bottom hinge lines and to cushion the bottom portions of the bottles in the carrier. The reinforcing blank 145 may be secured in proper position in the bottom of the carrier by securing the same to the bottom wall 143 as by spot gluing, stapling or by any other convenient fastening means. The reinforcing blank 145 may, of course, be assembled with the carrier blank during the folding operations or it may be inserted after the carrier is completely set up.

I claim:

1. In a paperboard article carrier adapted to receive articles therein which have a width across the bottom approximating the inside bottom width of the carrier, spaced upright wall forming members, a bottom wall structure having opposite side edges connected on parallel hinge lines to bottom portions of oppositely disposed upright wall forming members, and an inner relatively narrow weight distributing panel member which is positioned to extend diagonally upward from the bottom wall structure with its opposite side edges engaging the bottom wall structure and an upright wall member, respectively, on lines generally parallel to and spaced from the hinge line connecting the bottom wall structure and the upright wall member, whereby when an article is seated in said carrier the bottom side edge of said narrow panel member extends beneath the bottom face of the article in the carrier and the top side edge of said narrow panel member engages the adjoining upright wall member a predetermined distance above the hinge line connecting the bottom wall structure and said adjoining upright wall member so that the bottom edge of the article engages said narrow panel member intermediate the side edges of the latter and the weight of the article is transmitted to the walls engaged by the side edges of the panel member on lines closely adjacent to but spaced from said hinge line.

2. An article carrier formed of relatively flexible paperboard sheet material, which when set up for use provides spaced upstanding side wall forming members, a bottom wall structure hingedly connected to two opposite side wall members along bottom edge forming hinge lines, and an inner reinforcing structure for said bottom wall structure comprising a bottom wall reinforcing panel which is narrower than the bottom wall structure and which is arranged in face engagement with the inside face of said bottom wall structure so as to form at least two plies of material over the major portion of said bottom wall structure and relatively narrow cushioning and weight distributing panels which are hingedly connected at their inner side edges to the bottom wall structure along hinge lines closely adjacent to but offset a short distance inwardly of the hinge lines connecting the bottom wall structure with said side wall members and which have their outer edges engaging with portions of the side wall members on lines closely adjacent to but spaced a short distance above said last mentioned hinge lines whereby when articles are placed in said carrier with the bottom edges thereof extending outwardly of the side edges of said bottom wall reinforcing panel, the outer side edges of the articles will engage with and rest on said cushioning and weight distributing panels intermediate the side edges of said panels and the weight of the articles will be distributed through said panels over areas of the side wall members and the bottom wall structure adjoining said hinge lines, thereby reducing the stress in the hinged connection between the bottom wall structure and the side wall members.

3. A carrier for articles having a bottom width approximating the internal bottom width of the carrier, said carrier being formed of paperboard sheet material which is cut and creased to provide, when set up, pairs of oppositely disposed spaced upright side and end walls and a bottom wall connected along bottom edge forming crease lines to the bottom portions of a pair of the upright walls and an inner reinforcing panel for said bottom wall which inner reinforcing panel has a relatively narrow flange extending along an edge thereof, said inner reinforcing panel having a transverse dimension which is less than the corresponding dimension of the carrier bottom wall and being positioned in engagement with the inside face of said bottom wall and with said flange extending in upwardly inclined relation from a hinge line on the bottom wall, which hinge line is closely adjacent but inwardly spaced from the hinge line connecting the bottom and upright wall and with the outer terminal edge of said flange engaging with said upright wall along a line which is in closely adjacent but upwardly spaced relation to said hinge line connecting the bottom and upright wall, whereby when an article is placed in said carrier the bottom edge of the article will engage with said flange intermediate the terminal edge thereof and the hinged connection between the opposite edge and said panel and the weight of the article will be distributed over areas of the upright and bottom walls adjoining said edge forming crease line thereby minimizing the strain on the hinged connection between said upright and bottom walls of the carrier.

4. In a collapsible paperboard article carrier for articles having a bottom width corresponding approximately to the bottom width of the carrier, which carrier has a foldable bottom wall member, upright side wall members extending in hinged relation from opposite side edges of the bottom wall member and hingedly connected at the ends to upright end wall members, a foldable internal reinforcing and cushioning member for said bottom wall member which extends inwardly of an end edge of the bottom wall member in face engagement with said bottom wall member and which has a relatively narrow side marginal flange, the width of said reinforcing and cushioning member and its side marginal flange being greater than the width of said bottom wall member, said flange being bendable upwardly about a crease line spaced inwardly of the side hinge line connecting the bottom member and the adjoining side wall member and said flange having its outer edge engaging the side wall member above said hinge line and forming a cushioning bridge across said hinge line, whereby when an article is placed in the carrier the outside bottom edge of the article will engage said side marginal flange intermediate the side edges of said side marginal flange.

5. A cellular paperboard bottle carrier comprising spaced upstanding side wall and end wall forming members and a bottom wall forming member connecting the bottom edges of the side wall members, reinforcing and cushioning flap members inwardly hinged at the end edges of the bottom wall member, which flap members have a width greater than the width of the bottom wall member and which flap members have side marginal crease lines spaced inwardly of the bottom side edges of the side wall members, said crease lines dividing from said flap members relatively narrow side marginal portions, each of which marginal portions extends in an upwardly and outwardly slanted position relative to the bottom wall member with the outer edge of each marginal portion engaging the adjoining side wall member on a line spaced a relatively short distance above the bottom edge of said side wall member when the reinforcing flap member is in flat engagement with the bottom wall member so that the bottom edge of a bottle placed in the carrier will engage said narrow side marginal portion at a point intermediate the side edges thereof and the latter will distribute the weight of the bottle over the side and bottom wall areas adjoining the connection between the edges thereof and reduce the strain on the latter.

6. A cellular article carrier formed of paperboard sheet material which is cut and creased to provide, when set up, oppositely disposed pairs of spaced upright side and end walls, a bottom wall connected along bottom edge forming crease lines to the bottom portions of a pair of the opposed upright walls, cross partition walls dividing the carrier into two rows of cells and a bottom reinforcing panel for said bottom wall which is of less width than the bottom wall and which has hingedly connected relatively narrow marginal reinforcing flanges extending along the opposite side edges thereof, the total width of said reinforcing panel and said reinforcing flanges exceeding the width of the bottom wall, said reinforcing panel being positioned within the carrier against the bottom wall with said reinforcing flanges extending in upwardly inclined relation from the bottom wall and with the terminal edges of said flanges engaging with the upright side walls along lines which are closely adjacent to but in upwardly spaced relation to the bottom edge forming crease lines whereby when articles having a bottom width approximately the same as the width of the cells are placed in the cells of said carrier bottom edge portions of the articles will engage with said inclined flanges and the weight of the articles will be transmitted to and distributed over substantial areas of the bottom wall and the upright walls immediately adjoining said edge forming crease lines.

7. An article carrier formed of paperboard sheet material which is cut and creased to provide, when set up, oppositely disposed pairs of spaced upright side and end walls, a bottom wall connected along bottom edge forming hinge lines to the bottom portions of a pair of the opposed upright walls and a bottom reinforcing panel positioned within the carrier and against said bottom wall which bottom reinforcing panel has relatively narrow reinforcing flanges extending along the outer side marginal edges thereof, said reinforcing flanges being hinged to said bottom reinforcing panel on parallel lines spaced inwardly of said outer side marginal edges, said bottom reinforcing panel being positioned with said parallel hinge lines each spaced inwardly of a bottom edge forming hinge line a distance less than the width of said reinforcing flanges whereby said reinforcing flanges extend in upwardly inclined relation from the bottom wall and the terminal outer edges of said flanges engage with the upright walls closely adjacent to but in upwardly spaced relation to said bottom edge forming hinge lines so that when articles are placed in said carrier which have bottom portions thereof extending substantially the full width of the carrier, the bottom edges of the articles will engage with said flanges between said hinge lines and the weight of the articles will be distributed over areas of the bottom wall and the upright walls which adjoin said bottom edge forming hinge lines, thereby relieving the strain on the bottom hinge connection.

8. A carrier for articles which are characterized by having a bottom width, when arranged in the carrier, which corresponds approximately to the inside width of the bottom of the carrier, said carrier being formed from a paperboard blank cut and creased to provide a series of connected panels which, when erected, form upright side and end walls and a bottom wall connected to the bottom edges of the oppositely disposed side walls along longitudinal bottom edge forming hinge lines, said bottom wall comprising two panel portions integrally hinged to the side walls with their marginal portions overlapped and secured together, the bottom wall panel portion which is innermost having a relatively narrow flange hinged thereto along its marginal edge and extending diagonally upwardly with its terminal edge engaging the side wall on a line spaced a short distance above the hinge line connecting the outermost bottom wall panel portion with said side wall so as to position said flange in bridging relation over said hinge line, an inner bottom reinforcing panel extending over a portion of the bottom wall in engagement with said innermost bottom wall panel portion, said inner bottom reinforcing panel having a relatively narrow side edge flange which is hinged on a line offset a short distance inwardly of the bottom edge forming hinge line which connects the innermost bottom wall panel portion with its side wall, said side edge flange extending in upwardly inclined relation to the bottom wall and having its outer marginal edge engaging the side wall on a bearing line spaced a short distance above said last mentioned bottom edge forming hinge line whereby when articles are placed in the carrier said marginal edge flange and said side edge flange each extend diagonally upward beneath the bottom outer edges of the articles so as to distribute the weight of the articles in the bottom and side wall areas on opposite sides of the bottom edge hinge lines of the carrier.

9. An article carrier formed from a paperboard blank cut and creased to provide a series of connected panels which, when erected, form upright side and end walls and a bottom wall connected to the bottom edges of opposed side walls along longitudinal bottom edge forming hinge lines, an inner reinforcing panel in face engaging relation with the bottom wall and extending over a portion of the bottom wall, said reinforcing panel having a relatively narrow side edge reinforcing flange which is hinged on a line closely adjacent to but offset inwardly of a bottom edge forming hinge line, which side edge reinforcing flange extends in upwardly inclined relation to the bottom wall and has its outer edge engaging the side wall on a bearing line closely adjacent to but spaced above said bottom edge forming hinge line, and a relatively narrow edge reinforcing flange hinged to said bottom wall closely adjacent to but spaced from the opposite bottom edge forming hinge line of the carrier which last mentioned edge reinforcing flange extends in upwardly inclined relation to said bottom wall and has its outer side edge engaging the side wall on a bearing line closely adjacent to but spaced above said bottom edge forming hinge line.

References Cited in the file of this patent

UNITED STATES PATENTS

| | | |
|---|---|---|
| 1,840,677 | Miessler | Jan. 12, 1932 |
| 2,458,281 | Lupton | Jan. 4, 1949 |
| 2,537,615 | Arneson | Jan. 9, 1951 |
| 2,692,700 | Kowal | Oct. 26, 1954 |
| 2,696,942 | Ringler | Dec. 14, 1954 |
| 2,743,050 | Crane | Apr. 24, 1956 |
| 2,772,810 | Arneson | Dec. 4, 1956 |